March 19, 1929.  F. E. WRIGHT  1,705,951
PLOTTING BOARD
Filed March 20, 1924
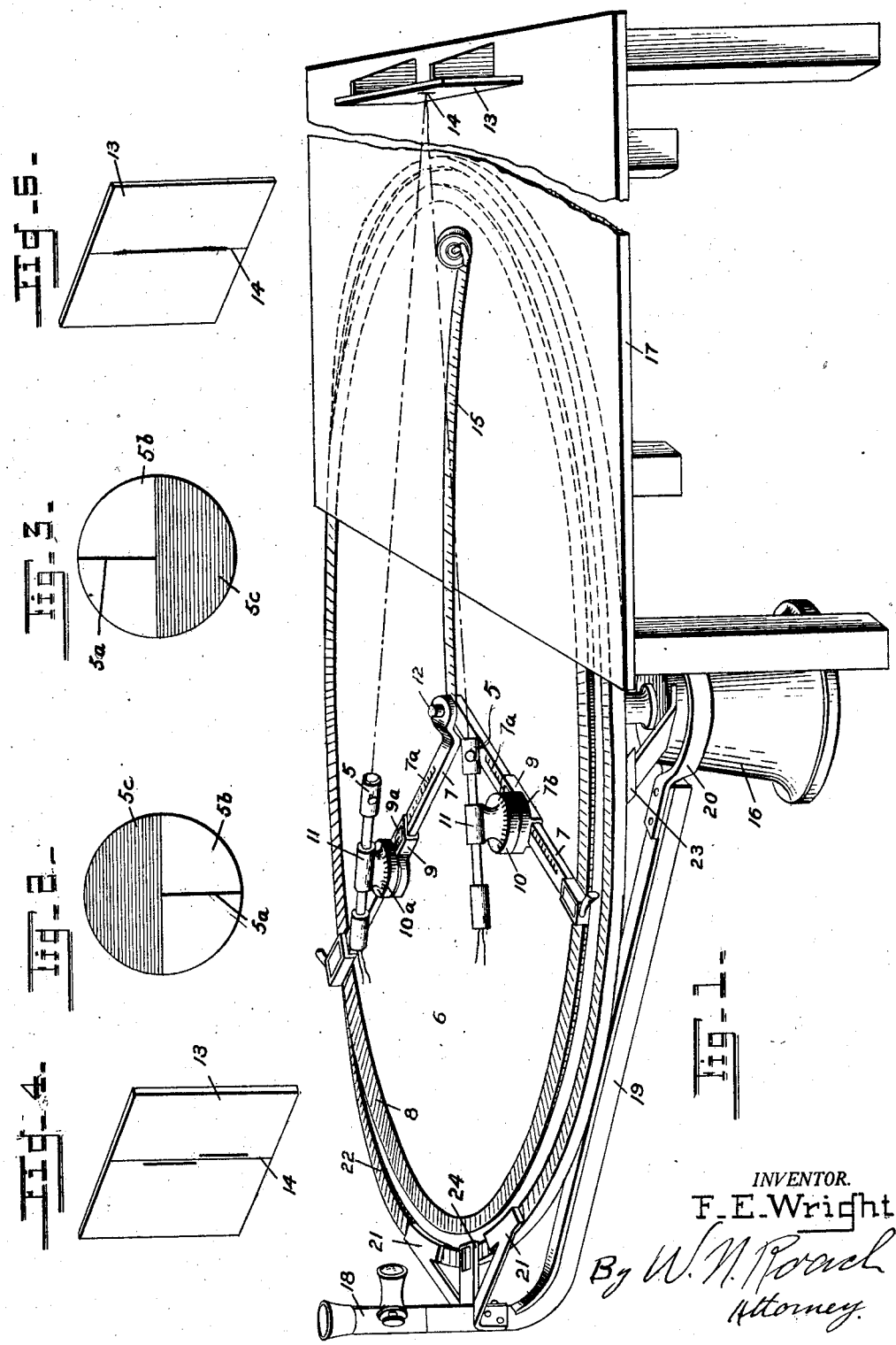
INVENTOR.
F. E. Wright
By W. N. Roach
Attorney.

Patented Mar. 19, 1929.

1,705,951

UNITED STATES PATENT OFFICE.

FREDERICK E. WRIGHT, OF WASHINGTON, DISTRICT OF COLUMBIA.

PLOTTING BOARD.

Application filed March 20, 1924. Serial No. 700,608.

(GRANTED UNDER THE ACT OF MARCH 3, 1883, AS AMENDED APRIL 30, 1928; 370 O. G. 757.)

The invention described herein may be manufactured and used by or for the Government or governmental purposes, without the payment to me of any royalty thereon in accordance with the act of March 3, 1883.

The subject of the present invention is a plotting board.

The primary object of the present invention is the establishment of a method by which firing data may be readily computed and the provision of a board on which the firing data may be determined.

A further object of the invention is the provision of a plotting board constructed so as to be used for any range but which will be compact in structure so as to take up a minimum of space.

With the foregoing and other objects in view, my invention resides in the steps constituting the novel method by which firing data are determined and in the novel arrangement and combination of parts and in the details of construction of the apparatus employed in determining in practice such data as hereinafter described and claimed, it being understood that changes in the precise embodiment of the invention herein disclosed may be made within the scope of what is claimed without departing from the spirit of the invention.

A preferred embodiment of a plotting board constructed according to my invention is illustrated in the accompanying drawing, in which, Fig. 1 is a view in elevation of such a board;

Fig. 2 is a view of the field of one of the projectors;

Fig. 3 is a view of the field of the other projector;

Fig. 4 is a view of the member representing the object observed with the rays of light from the projectors in disalignment; and Fig. 5 is a view of the object observed at the moment the rays are in coincidence.

In carrying out my invention projecting instruments 5 are employed representing the observing stations and these projectors are positioned on the plotting board 6 in the same relation to the pivot point 12 that the observing stations have to the gun.

The projectors may be of the ordinary magic lantern type and the image presented on a screen may be of any suitable character but to facilitate observation and to promote accuracy it should be defined by sharp lines. The preferred character of the image is a mark in the form of an outstanding band or pencil of light being the image of the filament of an electric light bulb used as the source of illumination. Such a pencil or ray of light may also be produced by the light from the projector traversing an aperture in the form of a narrow slit in an opaque grating or stop, again it may be produced by a reticule placed at a focal point of a lens system. In using the image of the filament, I prefer to obscure the upper half of one projector and the lower half of the other so that, as illustrated, in Figs. 2 and 3, the image as projected on the screen consists of a vertical radial line $5^a$ which represents a pencil of light of maximum brightness, being the image of the filament and positioned centrally in an area $5^b$ of less brightness, while the portion $5^c$ indicates that part of the field of the instrument which has been obscured to eliminate interference when the images from both projectors are superimposed on one another.

Any suitable method may be used and any suitable means employed for properly positioning these projectors. As shown, arms 7 are employed which arms are adapted to pivot at their inner ends and to move upon a scale 8 engraved in azimuth about the periphery of the plotting board 6 which is preferably circular in structure. The arms 7 are provided with a scale $7^a$. Guides 9 provided with a vernier scale $9^a$ readable against the scale $7^a$ are slidably mounted upon the arms 7 and are adapted to swivelly support rotatable members 10 inscribed with a scale $10^a$ graduated in degrees or mils of azimuth and readable against a reference mark $9^b$ on the guides 9. The scales $10^a$ only partially encircle the members 10 since it is evident that the stations represented by the projectors must restrict their sphere of action within parallelism if they are to indicate or represent elements required in a problem of triangulation. Fixedly positioned upon the members 10 are the brackets 11 which serve to support the projectors. In order that the axes of the projectors may be in the same plane, one of the arms 7 is offset as at $7^b$ adjacent its pivot but the projectors would function without this provision to project alining images on the screen, in which case, the full image, instead of a divided image, might just as well be employed. By setting the arms 7 in their correct azimuthal position with respect to the scale 8 which position will be determined from the location of the observing stations with respect to the gun, represented on the plotting board by the pivot pin 12, and then moving the slides 9 upon the arms 7 to the correct range setting or the distance of the observing stations from the gun the projectors will be set in the true relation of the observing stations to the gun.

After the members representing the observing stations have been thus properly set with relation to the member 12 representing the gun, the rotatable members 10 will be moved in azimuth to their proper setting which setting will coincide with the readings determined at the observing stations as to the position of the target or object observed. When the rotatable members 10 have been properly set, the projectors will be directed in the correct observed position with respect to the target or other object observed. If now a member representing the target or the object observed is moved until the rays of light emitted by the projectors are brought into coincidence, the observed position of the target will have been determined on the plotting board. To aid in this determination of the position of the target, I, preferably, employ a movable member on screen 13 on which may be drawn a reference line 14. When the member 13 representing the target or other object observed is moved until the pencils or rays from the projectors are brought into coincidence or alinement as shown in Figs. 4 and 5, the member representing the target or the object observed will have been brought into the correct observed relation to the gun. The position, then, of this member may be measured and from the measurements the firing data may be computed. A steel tape 15, one end of which is fastened to the pivot 12 representing the gun and which is preferably graduated in yards of range may be employed to measure the range from the gun to the object observed after the rays of light from the projectors have been brought into coincidence.

To enable the employment of my system of determining firing data and the structure employing the system, at long ranges, I have found it preferable to rotatably mount the plotting board 6 upon a support such as the pedestal 16 so that by rotating the plotting board, firing data for long ranges may be computed without the necessity for moving the member representing the object observed to a great distance from the member 12 representing the gun. Since it is necessary that the member representing the object observed move independently of the rotatable plotting board, I have found it desirable also to support this member 13 upon a table 17 which extends over that portion of the plotting board not in use, i. e., that portion of the board which lies between the pivot point 12 and the screen.

While it is possible to obtain true coincidence of the rays of light emitted by the projectors by observation with the naked eye, I have found it preferable to use a telescope, as for instance, the lower power right angle telescope 18, whose optical axis is always diametric to the plotting board. With such a telescope, it is possible to obtain more accurate coincidence than with the naked eye. Moreover, by mounting this telescope so as to be rotatable about the plotting board, it is possible to directly determine from the position of the telescope at the moment of coincidence, the proper deflection settings for the gun. I, therefore, have found it preferable to mount the telescope rotatably upon the pedestal 16 as by means of the arm 19 and the bearing 20. The telescope is preferably provided with shoes 21 movable upon a preferably circular track way 22, which extends about the plotting board and is supported as by means of the arm 23 from the pedestal 16. This track way is preferably graduated in degrees or mils of azimuth so that the position of the telescope may be read directly therefrom against the indicator arm 24, which is secured to the telescope.

In using a plotting board of the type described, the projectors will first be set in their true relation to the point 12. When an observation is taken at the observing stations upon the target or other object observed, the azimuthal readings will be telephoned or otherwise communicated to the operator in charge of the plotting board. The projectors will then be correctly set in azimuth according to these observations by this operator. When then the operator moves the member 13 representing the target or object observed until the rays of light from the projectors have been brought into coincidence with the reference line upon this member 13, it will be known that the member 13 has been moved into the correct relation with respect to the gun. The range from the gun to the target or object observed may then be determined by the range tape 15 and if the telescope 18 has been used to obtain the coincidence the deflection setting of the gun may be read directly from the scale engraved upon the track way 22.

While I prefer to use electric bulbs in the projectors, it is obvious that any other means capable of emitting rays of light may be employed in their stead and while I have described the use only of two projectors representing the observing stations, it is obvious that the number of projectors may be varied depending upon the number of observing stations, such portions of the fields of such projectors being darkened as will be necessary to obtain proper coincidence of the rays emitted by the projectors.

With a plotting board of the type described and manipulated according to the method employed in this invention, it is possible to obtain extremely accurate readings. By mounting the plotting board, moreover, so as to be rotatable with respect to the target or object observed, it is possible to use my plotting board within a comparatively limited space, as for instance, in a railway artillery car where unless some such means as I have devised were employed, it would be otherwise impossible because of the great ranges to which railway guns are fired to use a plotting board of the type described.

While I have described a particular method for setting the projectors with respect to the member representing the gun, it is obvious that any other means for setting these projectors in true relation to the gun may be used without altering the function of my invention.

The plotting board which forms the subject of this invention may be used not only for obtaining firing data with respect to the target, but also for properly locating the bursts according to the observed position of these bursts with respect to the target in bilateral or similar systems of observation. The plotting board itself is comparatively cheap, is easy to construct, and can be readily and rapidly operated.

Having thus described my invention, what I claim is:

1. A plotting board for determining data with respect to a gun and target embodying a rotatable support, a member representing the gun mounted thereon, a fixed support, a member representing the target movable thereon, a plurality of projectors representing the observing stations positionable on the rotatable support in true relation to the gun and target members and each adapted to present an image on the target member, means for measuring the distance between the gun and target members in terms of range when the images are coincident on the target member, a trackway graduated in azimuth fixedly positioned with respect to the rotatable support and a telescope slidably mounted on said trackway.

2. A plotting board for determining data with respect to a gun and target embodying a rotatable support, a member representing the gun mounted thereon, a fixed support, a member representing the target movable thereon, a plurality of projectors representing the observing stations positionable on the rotatable support in true relation to the gun and target members and each adapted to present an image on the target member, means for measuring the distance between the gun and target members in terms of range when the images are coincident on the target member, and means for indicating the deflection to be given the gun.

3. A plotting board for determining data with respect to a gun and target embodying a rotatable support, a member representing the gun mounted thereon, a fixed support, a member representing the target movable thereon, a plurality of projectors representing the observing stations positionable on the rotatable support in true relation to the gun and target members and each adapted to present an image on the target member, and means for measuring the distance between the gun and target members in terms of range when the images are coincident on the target member.

4. A plotting board for determining data with respect to a gun and target embodying a rotatable support, a member representing the gun mounted thereon, a movable member representing the target, a plurality of projectors representing the observing stations positionable on the support in true relation to the gun and target members and each adapted to present an image on the target member, means for measuring the distance between the gun and target members in terms of range when the images are coincident on the target member, a trackway graduated in azimuth fixedly positioned with respect to the rotatable support, and a telescope slidably mounted on said trackway.

5. A plotting board for determining data with respect to a gun and target embodying a member representing the gun, a movable member representing the target, a plurality of projectors representing the observing stations positionable in true relation to the gun and target members and each adapted to present an image on the target member, means graduated in values of range for directly measuring the distance between the gun and target members in terms of range when the images are in coincidence on the target member, and means including a telescope for determining the deflection to be given the gun.

6. A plotting board for determining data with respect to a gun and target embodying a member representing the gun, a movable member representing the target, a plurality of projectors representing the observing stations positionable in true relation to the gun and target members and each adapted to present an image on the target member, and means graduated in values of range for directly measuring the distance between the gun and target members in terms of range when the images are in coincidence on the target member.

7. A plotting board for determining data with respect to a gun and target embodying a member representing the gun, a movable member representing the target, a plurality of projectors representing the observing stations positionable in true relation to the gun and target members and each adapted to present an image on the target member, and means including a telescope for determining the deflection to be given the gun.

8. A plotting board for determining data with respect to a gun and target embodying a member representing the gun, a movable member representing the target, and a plurality of projectors representing the observing stations positionable in true relation to the gun and target members and each adapted to present an image on the target member.

FREDERICK E. WRIGHT.